Nov. 9, 1926. Re. 16,470
J. T. STONEY ET AL
VIBRATOR HOOK
Original Filed Sept. 12, 1921
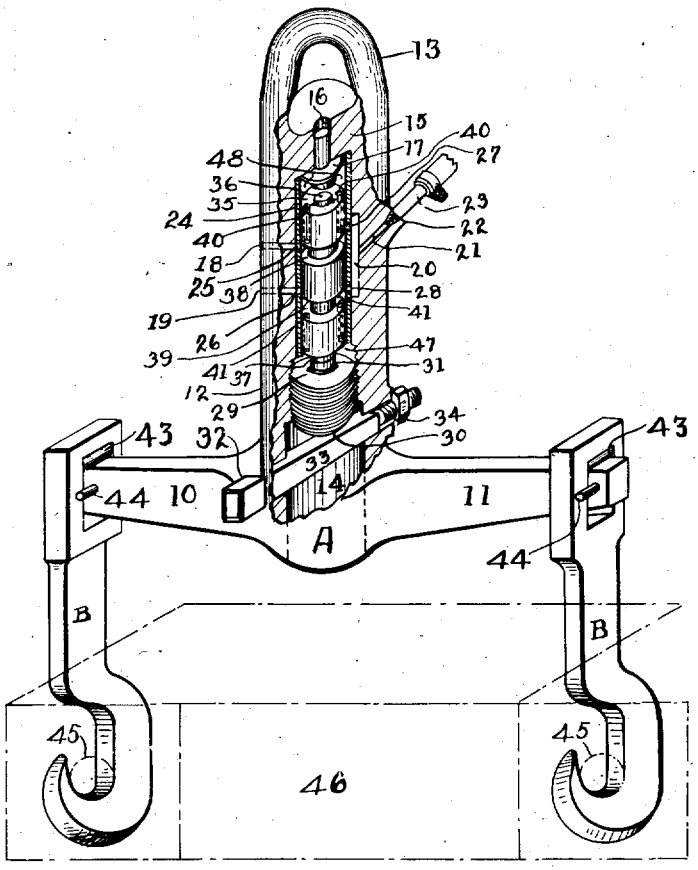
Inventor
John T. Stoney
Klemens Purvin
By Thurston, Kurz & Hudson
Attorney Reissued Nov. 9. 1926.

Re. 16,470

UNITED STATES PATENT OFFICE.

JOHN T. STONEY AND KLEMENS PURWIN, OF CLEVELAND, OHIO, ASSIGNORS TO THE STONEY FOUNDRY, ENGINEERING AND EQUIPMENT COMPANY, OF CLEVELAND, OHIO, A CORPORATION OF OHIO.

VIBRATOR HOOK.

Original No. 1,447,694, dated March 6, 1923, Serial No. 500,194, filed September 12, 1921. Application for reissue filed September 5, 1924. Serial No. 736,176.

Our invention relates to hooks to which a vibrator mechanism is attached.

The object of our invention is to provide a hook or similar mechanism with an efficient means for setting up vibrations in these hooks or other similar mechanisms for the purpose of removing sand, dirt, etc., from objects connected to these hooks, etc.

In many instances it is necessary that sand, or dirt, or other matter be removed from the inside or outside of boxes, flasks, etc., but such matter usually adheres to the walls of these boxes, etc., and requires considerable effort and time for its removal. In foundry flasks for instance, the sand adheres to the walls of the flasks after a mold is cast. It requires considerable time and effort to remove this sand by manual scraping and pounding on the flask with a mallet or other tool and, quite frequently, the flask is broken thereby.

The present invention aims to remove the sand from these flasks as well as other objects which are encumbered in a similar manner, by setting up vibrations in the material of a hook or other means upon which the flasks, etc., are suspended or supported and thereby shake out all sand, etc., without manual effort and in much less time than such operation could be done by manual means.

An apparatus to attain the above object is shown in the accompanying drawing and described in this specification, but it is understood that various changes and modifications may be made within the spirit of this invention and without sacrificing any of the advantages contained in the appended claims.

The accompanying drawing illustrates a vibrator hook mechanism in a single perspective view, partly broken away to show the vibrator mechanism clearly.

This hook mechanism comprises the bail A and the hooks B.

The bail A, made of suitable material, has the arms 10 and 11, and the cylindrical portion 12 substantially at right angles to these arms, and the loop 13 which is adapted to be engaged by a crane hook or other means.

This portion 12 has the counterbore 14 which is open at the bottom where it is threaded as shown, but which is closed at the top by the wall 15 integral with the portion 12 of the bail A. This wall 15 has the opening 16 into which the anvil block 17 is driven. This portion 12 further has the exhaust ports 18 and 19, and the inlet chamber 20, and the inlet port 21 opening into the chamber 20, and the boss 22 into which the supply pipe 23 is screwed. A rubber hose or other means may be attached to the pipe 23 for connection with a source of fluid pressure supply.

Inside of this counterbore 14 is the sleeve 24 which is renewable when worn and is provided with the exhaust ports 25 and 26 corresponding to the exhaust ports 18 and 19 and with the inlet ports 27 and 28 properly spaced and opening into the chamber 20.

This proper spacing of the inlet ports 27 and 28 will appear hereinafter.

This sleeve 24 may be renewed when worn so that the bail A itself is not affected by wear and this sleeve also establishes a wall between the main bore of the cylinder and the chamber 20 so that the entering fluid pressure can not reach the inside of the sleeve 24 except through the inlet ports 27 and 28.

The plug 29 is screwed into the threaded end of the bore 14 and has the rounded outer end 30 and the anvil boss 31 projecting a short distance outside of the main body of the plug 29.

This anvil boss 31 and the anvil block 17 should be suitably hardened to prevent upsetting, but should not be so brittle that pieces may break off and interfere with the action of the vibrator.

Through the lower portion of the cylindrical portion 12 and properly spaced in relation to the round end 30 of the plug 29 is the rectangular opening 32 to receive the taper key 33.

This key 33 is so located that the upper surface thereof bears against the round end 30 of the plug 29 while the bottom surface thereof rests firmly upon the material of the bail A.

The taper construction of this key, aided by the nut 34 thereon, establishes a firm connection and a solid joint between the plug 29 and the material of the bail A, and such joint can be taken up in case the elements wear and can be held tight by means of the nut 34 which is not affected by the action of the vibrator mechanism since it acts substantially at right angles thereto and the taper of the key need not be sufficiently great to exert any appreciable force against this nut.

It is not necessary that the plug 29 be threaded into the opening 14 and any suitable means of closing the lower end of this opening may be employed.

It is important however, whatever mechanism is employed, that the block 17 and the plug 29 bear directly upon the material of the bail A so that the vibrator mechanism acts directly against the material of the bail A and creates vibrations therein.

Inside of the sleeve 24 is the plunger 35 which is provided with the anvil projections 36 and 37 and with the grooves 38 and 39, suitably spaced as will appear hereinafter, and with the holes 40 and 41 opening into the grooves 38 and 39 respectively.

The anvil projections 36 and 37, as well as the plunger as a whole, are properly hardened to mitigate wear of the plunger proper as well as upsetting of the projections 36 and 37, but these projections should not be sufficiently brittle to chip or permit pieces to break off and interfere with the action of the vibrator mechanism.

The hooks B shown have the openings 43, preferably rounded at the top as shown, by which they are suspended on the ends of the bail A and are held there in suitable position by the pins 44, the rounding of the tops of the openings 43 permits the hooks to rock on the arms 10 and 11 of the bail A.

The lower ends of these hooks are adapted to engage the projections 45 of the flask 46 shown in dot and dash lines. These lower ends may be modified to engage other articles and the upper ends may be modified for rigid or other connection to the bail.

The operation of this apparatus is as follows:

Fluid pressure, such as compressed air for instance, is admitted through the pipe 23 into the chamber 20. The plunger is now in its lowest position, as shown in the drawing, due to its own weight when the vibrator mechanism is at rest. Fluid pressure now flows from the chamber 20, through the port 28, into the groove 39, through the hole 41, and into the space 47. At the same time, the space 48 is in communication with the open air through the hole 40, the groove 38, and the exhaust ports 25 and 18. The exhaust port 26 is now closed by the plunger.

The fluid pressure in the space 47 now forces the plunger upward until it strikes the block 17 at which stage the groove 38 registers with the inlet port 27, admitting fluid pressure to the space 48 through the hole 40 and forcing the plunger downward until it strikes the plug 29; during this stroke, the fluid pressure escapes from the space 47 through the hole 41, the groove 39, and the ports 26 and 19. This operation is repeated and continues to repeat automatically as long as fluid pressure is supplied to the chamber 20.

The relative spacing of the grooves 38 and 39 and the ports 25, 26, 27 and 28 should be so arranged that the plunger opens and closes these ports at the proper time.

When the plunger operates as set forth and strikes the anvils sharp vibrations are set up or created in the anvils and are transmitted directly to the material of the bail A and from there to the hooks, B and to the flask 46. These vibrations in the flask 46 cause all sand, etc., to be loosened and removed therefrom in much less time than manual effort could do so.

It will be seen that this apparatus is efficient since it removes sand, etc. effectively and quickly, has few parts, the parts subject to wear can be adjusted and renewed, and the vibrations created are transmitted directly to the article operated upon.

We claim:—

1. Cleaning apparatus of the character described, comprising as a part of the same general structure a means for suspending the apparatus, a supporting means for the article to be cleaned, and a mechanism for setting up continuous vibrations, for causing the material of the article to be rapidly vibrated to thereby sluf off the loosely clinging material.

2. Cleaning apparatus of the character described, comprising a means for suspending the apparatus, a supporting means for the article to be cleaned, and a mechanism for setting up vibration in the material of the supporting means, whereby said vibration is transmitted to the article to be cleaned to thereby sluf off the loosely clinging material.

3. Cleaning apparatus of the character described, comprising a means for suspending the apparatus, a supporting means for the article to be cleaned, and a vibrating machine carried by one of said means thereby to impart vibration to the supporting means, whereby vibration is transmitted by it to the article to be cleaned.

4. Cleaning apparatus of the character described, comprising a means for suspending the apparatus, a supporting means for the article to be cleaned, and a vibrating machine incorporated as a part of one of said means whereby vibrations will be set up in the supporting means and transmitted to the article to be cleaned.

5. Cleaning apparatus of the character described, comprising a means for suspending the apparatus, a supporting means for the article to be cleaned, one of said means being provided with oppositely displaced striking plates, and a vibrating machine incorporated as a part of such means and adapted to strike against said striking plates whereby vibration will be set up and transmitted to the article to be cleaned.

6. An apparatus of the character described comprising a bail, a vibrator mechanism mounted in said bail, and a hook mechanism attached to said bail.

7. An apparatus of the character described comprising a bail having a cylinder, a vibrator mechanism mounted in said cylinder, and a hook mechanism attached to said bail.

8. An apparatus of the character described comprising a bail, a fluid pressure operated vibrator carried by the bail, and a hook mechanism attached to said bail.

9. An apparatus of the character described comprising a bail having a cylinder provided with a longitudinal counterbore open at the bottom and with a transverse opening near the bottom, a vibrator mechanism in said counterbore, a plug in the open end of said counterbore, a key in said transverse opening and its upper surface bearing against said plug and its lower surface resting on the wall of said cylinder, and a hook mechanism attached to said bail.

10. An apparatus of the character described comprising a bail having a cylinder, a vibrator mechanism mounted in said cylinder, and a key traversing said cylinder and the upper surface thereof bearing against said vibrator mechanism and the bottom surface thereof resting upon the material of said bail.

11. An apparatus of the character described comprising a bail, a vibrator mechanism mounted in said bail and acting directly on said bail in its upward strokes and acting on said bail through a key means on its downward strokes.

JOHN T. STONEY.
KLEMENS PURWIN.